Nov. 17, 1953  C. A. VOSSBERG, JR  2,659,823
MEASURING SYSTEM
Filed Sept. 21, 1951  3 Sheets-Sheet 1

INVENTOR.
CARL A. VOSSBERG, JR.
BY
D. Stephen Baker
ATTORNEY

Nov. 17, 1953   C. A. VOSSBERG, JR   2,659,823
MEASURING SYSTEM

Filed Sept. 21, 1951   3 Sheets-Sheet 2

INVENTOR.
CARL A. VOSSBERG, JR
BY
S. Stephen Baker
ATTORNEY

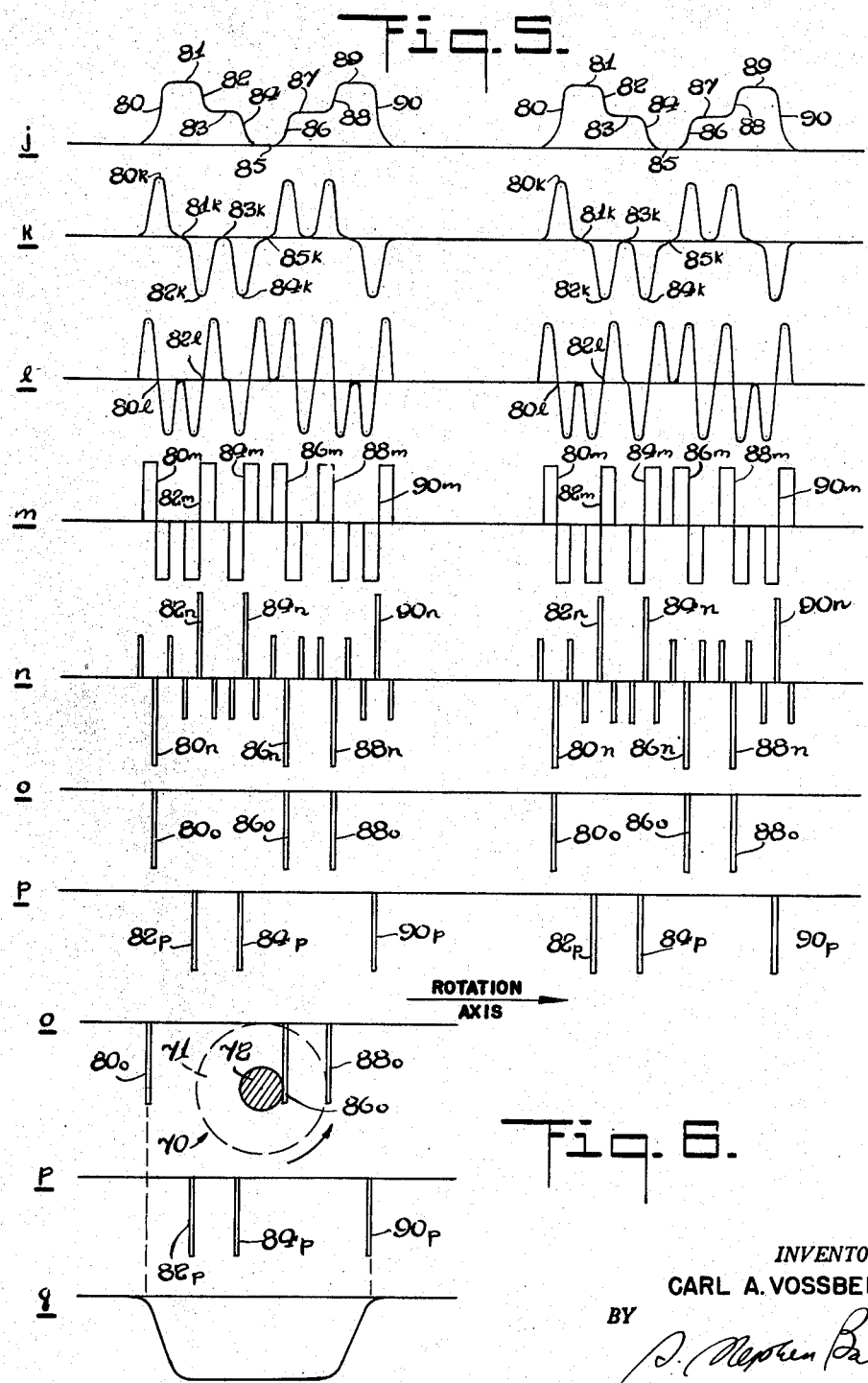

Patented Nov. 17, 1953

2,659,823

UNITED STATES PATENT OFFICE 2,659,823

MEASURING SYSTEM

Carl A. Vossberg, Jr., Lynbrook, N. Y.

Application September 21, 1951, Serial No. 247,673

12 Claims. (Cl. 250—59)

1

The present invention relates to measuring apparatus and more particularly to such apparatus which is suitable for use in situations where it is desired to measure a linear dimension of an object where any physical contact therewith is either undesirable or impossible.

As an example of the environment where the invention may be advantageously used, in the process of hot rolling steel strip, it is desirable to have a continuous indication of the width of the moving strip of hot steel. In such a situation, it is impractical to measure the width by the usual mechanical types of gauges which require continuous physical contact with the moving red hot steel. Among other difficulties, a gauging member touching the hot steel, would become rapidly pitted or abraded resulting in a serious impairment of accuracy.

Another instance in which the invention will provide uniquely advantageous performance is in the measurement of the various diameters and the concentricity of a continuously moving coated or covered wire, such as an insulated copper wire, for example. In the case of an insulated wire, mechanical contact for measurement purposes with the moving copper conductor through the insulating covering is obviously impossible.

Bearing the foregoing in mind, I have devised a novel apparatus in which an optical system produces an image of the object to be measured, either by suitable illumination of the object, or by direct radiation from the object itself, as in the case of hot steel. In the case of the insulated wire, X-rays may be used to obtain images of differing brightnesses for the walls of the outer covering and for the central metallic conductor.

Scanning means are provided for continuously scanning this image along the dimension to be measured, the scanning means producing an electrical image signal of theoretically rectangular wave shape, but in actual practice, of rounded wave shape. This rounding results from imperfections in the optical and scanning systems and renders the signal unsuitable for dimensional measurements by known methods.

In the wave shape of the image signal, however, there are points of maximum slope which correspond accurately to the leading and trailing edges of the image being scanned. In the measurement of the concentricity of the central conductor of an insulated wire with respect to its outer covering, the points of maximum slope will correspond with the boundaries between portions of the image in which there is a difference in

2 brightness. By the use of differentiating and shaping circuits, these points of maximum slope are converted to signal peaks, which are then shaped to produce distinct pulses, or pips. Each of these pips corresponds to a change in brightness of the image. When measuring the width of hot strip steel, for example, there will be two distinct pips, one of them corresponding to the leading edge of the image, and the other to its trailing edge.

These various pips are then applied to trigger circuits or similar circuits having two or more conditions of stability. One of the pips abruptly changes the trigger to one condition and another pip changes it back. The resulting output from the trigger circuit is a rectangular wave whose shape is practically identical with that of the theoretical, or ideal image signal. Accordingly, the improved apparatus so acts upon the original, unsuitable signal as to reconstruct one or more theoretical ideal rectangular waves in which the width of the reconstructed wave accurately corresponds to the desired dimension of the object.

By measuring the percentage of time during which the trigger remains in either of its stable conditions, an indication of the magnitude of the desired dimension is obtained.

Referring to the drawing:

Figure 5 illustrates certain wave shapes at different points in Fig. 4;

Figure 6 illustrates the relative locations of measuring and synchronizing pulses with respect to the object being measured.

Figure 1:
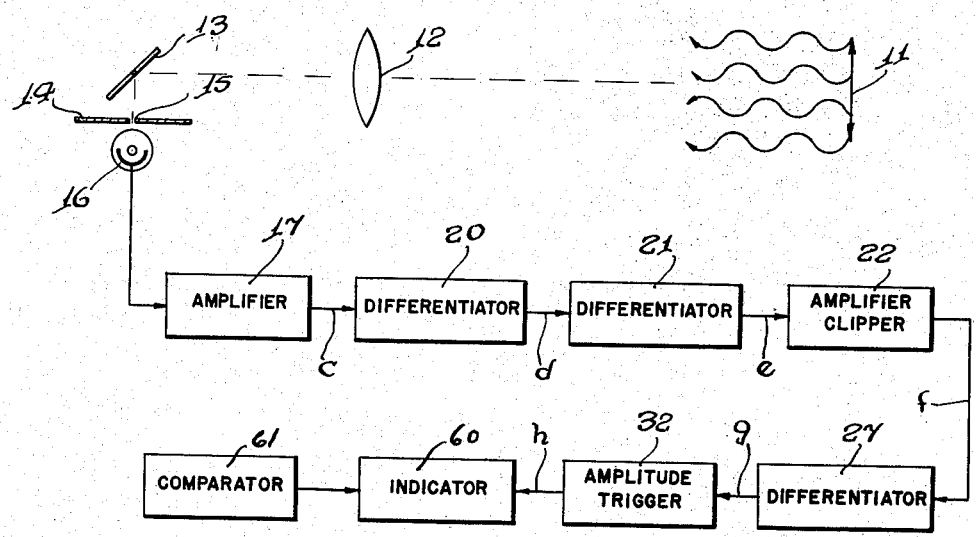
Figure 1 is a schematic or diagrammatic representation of an embodiment of the invention.

Referring to Fig. 1, an object 11, to be measured is shown as emanating radiant energy, which in the case of a hot strip of steel, would consist principally of infra-red radiations. If the object is not self-radiant, then illumination may be supplied from either side of the object resulting in a reflected image in one case, or a shadow in the other. Either the reflected image or the shadow may be used in the same manner as the image produced by self-radiation. Any system of illumination may be used which will produce an optical image of the object to be measured.

An optical system represented diagrammatically as a lens 12 focuses an image of the object 11 by reflection from a revolving mirror 13, on a horizontal plate 14 which is shown provided with an aperture slit 15. The image thus produced moves across aperture slit 14 at a rate which is determined by the angular velocity of rotation of mirror 13. For simplicity of illustration, mirror 13 is shown as having only two reflecting surfaces. Ordinarily, a greater number of reflecting surfaces will be used. Also other types of scanning may be used, such as electronic, provided that any such system produces a signal in which those edges of the object which determine the dimension or dimensions to be measured appear as electrical impulses spaced apart in time, in ratio to the dimension being measured.

Light from the image of the object 11 passes through aperture slit 15 and falls on a phototube 16, which converts the light into an electrical signal, which in turn is amplified by an amplifier 17.

Figure 2:
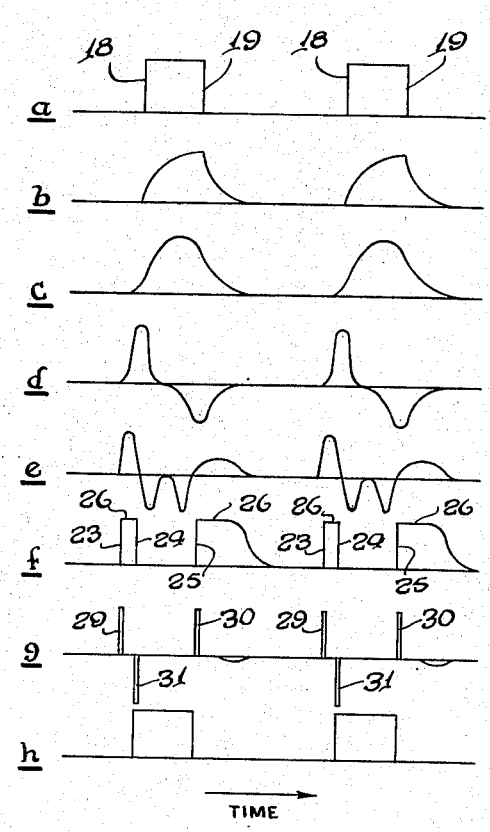
Figure 2 illustrates certain wave shapes at different points of Fig. 1.

Under ideal conditions this signal would have a rectangular wave shape as indicated at $a$ in Fig. 2. Revolving mirror 13, which is driven at substantially constant speed by a suitable motor or other device (not shown) causes the image of object 11 to move past aperture slit 15 at substantially constant velocity. Accordingly, the duration of the time interval in which light, or darkness, as the case may be, produced by the image of the object will in direct ratio to the linear dimension of the object being measured. Thus, during a complete scanning interval, the ratio of the image signal interval to the duration of the complete scanning interval will be directly proportional to the dimension being measured.

In the rectangular wave at $a$ in Fig. 2, the duration of the scanning interval is indicated as the time between successive vertical sides 18 of the rectangular wave, and the image signal interval is the time between vertical sides 18 and 19 of the rectangular wave.

In practice, the theoretical rectangular wave cannot be obtained. Imperfections in the characteristics of the phototube will cause this signal to have the modified shape shown at $b$ in Fig. 2. Additional factors, such as imperfections in the optical system and the finite width of aperture slit 15 result in an actual signal as shown at $c$ in Fig. 2, which represents the wave shape at the output of amplifier 17. In addition, non-uniform spatial energy distribution of object 11 may cause additional variations.

The signal $c$, is not directly suitable for use, because of the gradually sloping sides, and this wave shape must be modified before it can be applied to achieve accurate dimensional measurement. It will be noted, that the edges of the object 11 correspond with considerable accuracy to the points of maximum slope of the signal wave $c$ of Fig. 2.

The output of amplifier 17 is applied to a differentiator 20, which may be of any well-known type. Differentiator 20 includes one or more reactive circuit elements, and its output, as shown at $d$ of Fig. 2, is an intermediate signal which is approximately the first derivative of the input wave $c$. The output of the differentiator, has an amplitude which corresponds to the rate of change of the input wave, rather than to amplitude of the input wave. This is accomplished by connection of an amplifier tube to respond to the voltage drop across an inductive circuit element, for example, such a voltage drop being in direct proportion to the rate of change of current flow through the inductance. Capacitive circuit elements may also be used, the instantaneous charging current of a condenser being in direct proportion to the rate of change of a potential applied to its terminals.

The output of differentiator 20 is applied to a further differentiator 21, the output signal from the second differentiator 21 being the second derivative and shaped substantially as indicated at $e$ in Fig. 2. It will be noted that the two successive differentiations result in a wave shape which crosses the axis at points corresponding to the maximum slopes of signal $c$ and the zero slopes of intermediate signal $d$.

The modified signal wave $e$ is applied to a rectifying amplifier-clipper 22 which produces an output wave as shown at $f$ in Fig. 2. The amplification produces the relatively steep sides 23, 24 and 25 and the clipping action provides the flat top portions 26 by cutting off the peaks of the amplified input wave $e$.

Differentiation of wave $f$ by differentiator 27 produces an output as shown at $g$ which consists of two positive pips 29 and 30, and a negative pip 31. These pips are applied to an amplitude trigger 32 which produces an output of substantially rectangular wave shape as indicated at $h$.

Figure 3:
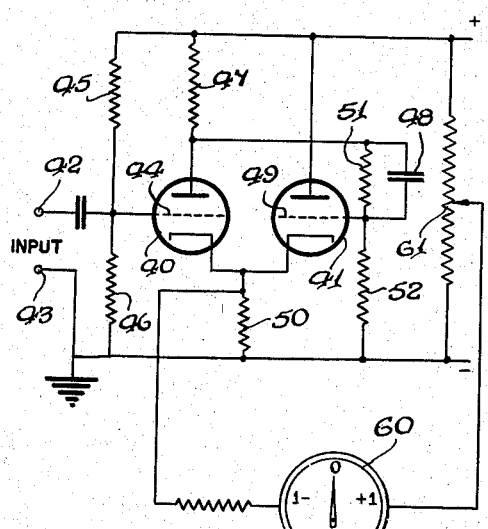
Figure 3 is a schematic circuit drawing of an indicating circuit suitable for use with Fig. 1.

A suitable circuit for amplitude trigger 32 is shown in Fig. 3. A pair of triodes 40 and 41 are shown connected to provide a trigger circuit having two conditions of stability. In one of these conditions, triode 40 is conducting and in the other condition, triode 41 is conducting. The two tubes 40 and 41 are so interconnected that conduction through one tube cuts off conduction through the other. The output is a wave of rectangular shape as shown at $h$ in Fig. 2, which will provide the desired indication of the dimension to be measured.

It will be noted from the input wave $g$, that the negative pip 31 coincides in time with the leading edge of the image of the object being scanned, that the positive pip 30 coincides with the trailing edge. Wave $g$ is applied to input terminal 42 of the trigger circuit shown in Fig. 3, the other input terminal 43 being shown grounded. The grid 44 of triode 40 is maintained at a suitable potential by a voltage divider consisting of resistors 45 and 46.

Assuming that triode 40 is conducting, negative pip 31 will render grid 44 momentarily negative, cutting off conduction through triode 40. This reduces the current flow through anode resistor 47 associated with triode 40, and renders the anode of triode 40 relatively more positive. This abrupt change in potential is applied through a coupling capacitor 48 to the grid 49 of triode 41, causing this tube to draw current.

Because there is no dropping resistor in the anode circuit of triode 41, the current drawn by this tube will be relatively greater than the current drawn by tube 40, and the current through common cathode resistor will be increased. This increase of positive potential on the cathode of triode 40 is equivalent to a negative potential applied to its grid 44, and consequently triode 40 will remain cut off. The voltage divider consisting of resistors 51 and 52, together with anode resistor 47, maintains grid 49 of triode 41 at the appropriate steady state potential to maintain triode 41 in a conducting condition.

When positive pip 30 is applied to input terminal 42, triode 40 is abruptly rendered conductive. This produces a sharp drop in positive potential at the anode of triode 40 which is applied as a negative pulse through coupling capacitor 48 of the grid 49 of triode 41, cutting off conduction through this latter tube. Cut off of triode 41 decreases the current through common cathode resistor 50 and renders the cathode of 40 less positive with respect to its grid 44. This raises the positive potential of grid 44 with respect to its cathode and conduction through tube 40 will continue until a negative pulse is applied to input terminal 42.

It will be noted that positive pip 29 will have no effect on the trigger circuit, because triode 40 will have been previously rendered conductive by positive pip 30. Accordingly, undesired pip 29 will not interfere with the correct flipping of the trigger circuit.

The action of the trigger circuit of Fig. 3 produces a sharp increase in the current in common cathode resistor 50 in response to negative pip 31, followed by a sharp decrease in current in response to positive pip 30, positive pip 29 being ineffective. The current in cathode resistor 50, thus increases abruptly in response to the leading edge of the image of the object being measured, and decreases abruptly in response to the trailing edge. This produces corresponding abrupt changes in potential of the cathodes of triodes 40 and 41.

This abruptly changing cathode potential is applied to an indicator 60, shown by way of illustration as a center zero voltmeter. The other terminal of voltmeter 60 is connected to what may be termed a comparator which is shown in Fig. 3 as a potentiometer 61. Voltmeter 60 is connected to a point of adjustably fixed potential on potentiometer 61 which thus provides a bucking voltage. Potentiometer or comparator 61 may conveniently be calibrated in terms of nominal width of the object being measured.

The greater the width of the object being measured, the greater will be the portion of the scanning interval during which the current in cathode resistor 50 is increased. Accordingly, potentiometer 61 must be adjusted to apply a greater positive potential to voltmeter 60 in order to obtain a zero reading. The point on potentiometer 61 at which this potential is obtained will be a direct function, although not necessarily linear, of the width of the object being measured. Deviations in width from the nominal width of the object being measured, will be accompanied by deflections of voltmeter 60 from its zero center indication. Voltmeter 60 may be calibrated so that these deviations may be read directly in units of linear measurement, or in percentage, as desired.

By suitable damping, indicating meter 60 may be made unresponsive to the scanning frequency determined by the speed of rotation of mirror 13, thereby giving an indication which will be proportional to the average value of the current flowing therethrough. Since the average magnitude of the current flow through indicating meter 60 is determined solely by the ratio of the duration of the rectangular wave to the duration of the complete scanning cycle, this magnitude will not be affected by variations in the scanning rate. Thus the accuracy of measurement will be consistently maintained notwithstanding changes in the speed of rotation of mirror 13 or the scanning frequency of an electronic or other scanning system.

Variations in the amplitude of the image signal will likewise not affect the accuracy of measurement. The effects of such variations are eliminated by the first differentiation in differentiator 20. Amplitude variations in the shapes of the other waves will similarly have little or no effect, except in the final rectangular wave $h$. In this latter instance, the effects are minimized by the Wheatstone bridge connections between potentiometer or comparator 61 and the trigger circuit through indicator 60.

Figure 4:
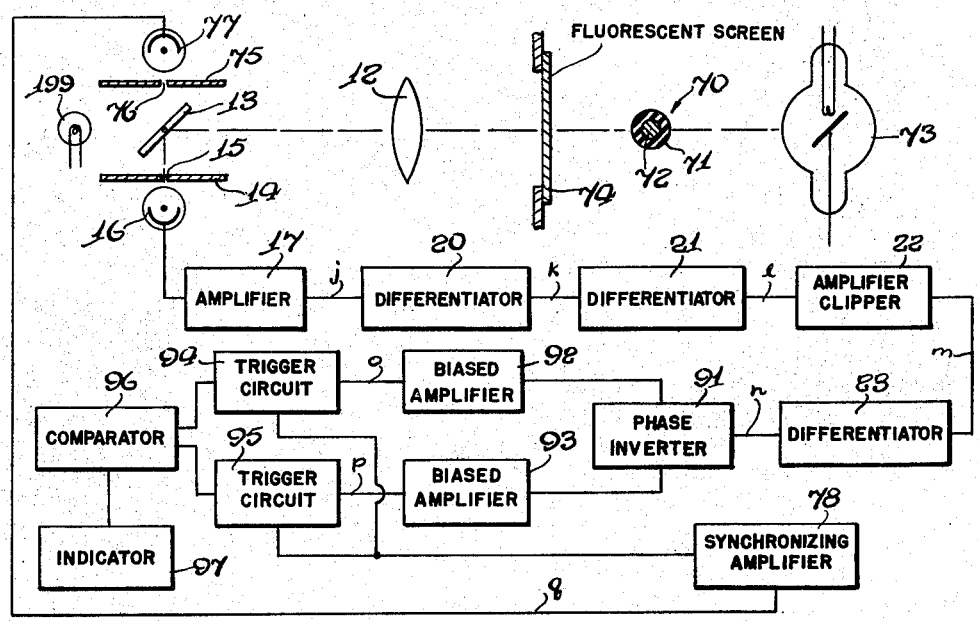
Figure 4 is a schematic or diagrammatic representation of a modified embodiment of the invention suitable for measurement of a mechanically inaccessible dimension.
Figure 7:
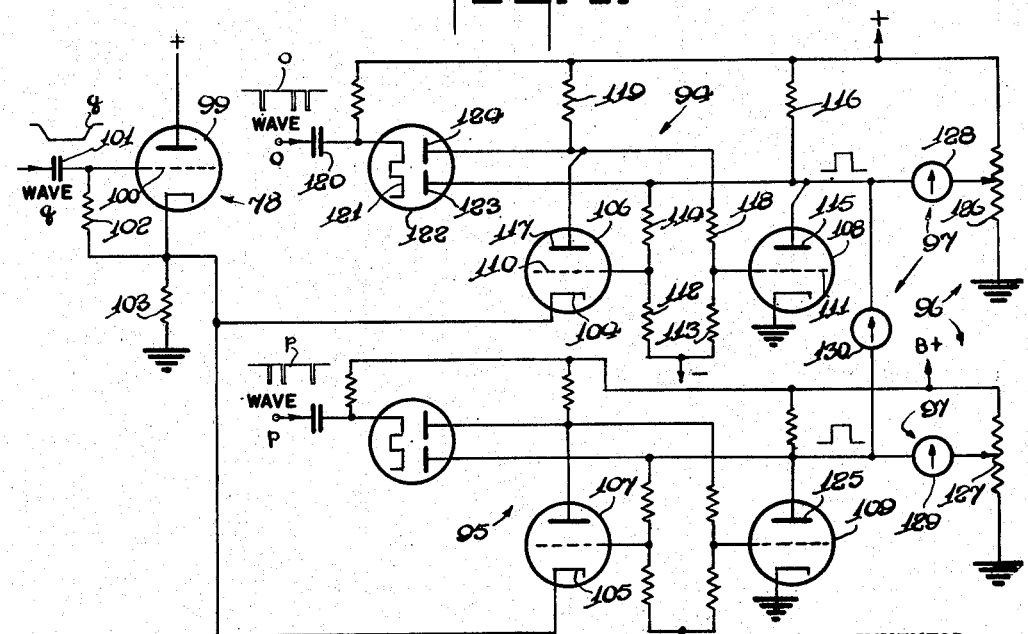
Figure 7 is a schematic circuit diagram showing in greater detail some of the circuits of Fig. 4.

Referring to Fig. 4, a modified embodiment of the invention is illustrated, which in the specific example shown, is adapted for the measurement of the concentricity of an insulated conductor.

The conductor to be measured is designated generally as 70 and comprises an outer covering of insulating material 71 which encloses a central conductor 72. The conductor 70, which is shown in cross-section, may be in continuous longitudinal motion, as in the course of its manufacture, or its inspection.

An X-ray tube or other source of penetrating radiations 73 is disposed to illuminate a fluorescent screen 74. Insulated wire 70, being interposed between X-ray tube 73 and fluorescent screen 74, casts a shadow upon screen 74 which will have a dense central portion produced by the wire 72 and two outer portions of less density produced by the insulating covering 71.

The shadow image on screen 74 is optically projected by suitable means indicated diagrammatically as a lens 12 upon revolving mirror 13 which causes a corresponding moving image to be focused upon a horizontal plate 14 which is shown provided with an aperture slit 15, as in the case of Fig. 1.

For synchronizing purposes, as will be described below, a similar image is projected upwardly on another horizontal plate 75 which is shown provided with an aperture slit 76. Light passing through slit 76 falls upon photocell 77 which is connected to a synchronizing amplifier 78. Instead of the photocell 77, a commutator arrangement may be used, if desired, the commutator being driven in synchronism with revolving mirror 13.

Light from revolving mirror 13 passing through aperture slit 15 falls upon photocell 16. The image signal thus produced is amplified by an amplifier 17 and differentiated successively by a first differentiator 20 and a second differentiator, being amplified and clipped by amplifier-clipper 22, and then finally differentiated by differentiator 23. This treatment of the image signal is in all respects similar to that described above for Fig. 1.

The amplified image signal will have a wave shape of the character indicated by curve $j$ in Fig. 5. This curve has an initial rising portion with a point of maximum slope at 80, which corresponds to the initial scanning of fluorescent screen 74. The signal remains relatively steady as indicated at 81, until the outer edge of the shadow of insulated wire 70 is scanned, thereby producing a downwardly curving portion having a point of maximum slope at 82 which corresponds to the outer edge of the insulated wire 70. The curve again remains relatively horizontal until the outer edge of the central conductor is scanned, when it again dips downwardly, providing another point of maximum slope at 84.

Afterwards, the curve continues in a symmetrical manner through point 86, which represents the trailing edge of the central metallic portion, portion 87, corresponding to the wall of insulation opposite to that which produced portion 83, and thence through point 88 which represents the trailing edge of the entire image of the wire 70. Portion 89 corresponds to the full brilliance of the fluorescent screen 74, and point 90, the point of maximum slope as the trailing edge of the image of screen 74 is scanned.

After the first differentiation by differentiator 20, the wave has the shape shown in curve $k$ of Fig. 5, the portions of the wave shape corresponding to those described for curve $j$ being designated 80$k$, 81$k$, etc., through 90$k$.

After the second differentiation by differentiator 21, the wave shape corresponds to curve $l$.

Amplifier-clipper 22 modifies the second derivative wave of curve $l$ to produce the wave of comparatively rectangular shape represented by curve $m$.

After final differentiation by differentiator 23, a series of pips is produced, as in the case of Figs. 1 and 2. Because of the greater complexity of the wave shape of image signal shown in curve $j$, there are undesired pips of approximately half amplitude shown in curve $n$ accompanied by pips of full amplitude, some of which are undesired. All of the points of maximum slope of curve $j$, namely 80, 82, 84, 86, 88 and 90 are represented by correspondingly spaced pips of full amplitude 80$n$, 82$n$, 84$n$, 86$n$, 88$n$ and 90$n$. Of these latter, 80$n$ and 90$n$ represent the fixed edges of fluorescent screen 74, and therefore have no bearing on the dimensions of wire 70, and are thus undesired, their effect being eliminated by a synchronizing arrangement.

A comparison between the wall thicknesses of insulating covering 71 on opposite sides of central conductor 72 will furnish a direct measure of concentricity. If the wall thicknesses are equal, the conductor 72 is concentric with respect to its insulating covering 71. Any deviation from this condition of equality represents an undesired eccentricity of the center conductor 72.

It will be noted from curve $n$ that pips 82$n$ and 84$n$ whose spacing is determined by the thickness of the leading wall of insulation are of one polarity, in this case shown as positive, while pips 86$n$ and 88$n$ whose spacing is determined by the thickness of the trailing wall are of the opposite polarity. Accordingly, the output of differentiator 23 is applied to a phase inverter 91, having two outputs, the pulses of one polarity being directed to one output and pulses of the opposite polarity to the other output.

One of the outputs from phase inverter 91 is applied to a biased amplifier 92 having a threshold below which no transmission occurs. This has the effect of eliminating undesired half amplitude pips of one polarity from the full amplitude pips of the same polarity. The resulting output from amplifier 92 is represented by curve $o$ of Fig. 5. Similarly, the other output of phase inverter 91 is applied to another biased amplifier 93 whose output is represented by curve $p$ of Fig. 5. The output polarities from the two biased amplifiers 92 and 93 are so arranged that the pips 80$o$, 86$o$ and 88$o$ are of negative polarity like pips 82$p$, 84$p$ and 90$p$. The relative positions of these pips with respect to the various cross-sectional portions of insulated wire 70 are shown in Fig. 6.

The waves $o$ and $p$ are individually applied to trigger circuits 94 and 95, respectively, these trigger circuits being connected through a comparator designated generally as 96, to an indicator designated generally as 97 which may include a plurality of individual indicating instruments. The synchronizing amplifier 78 is connected jointly to both trigger circuits 94 and 95, and renders them operative only during the scanning of the shadow of wire 70, thereby eliminating the impulses produced by scanning the edges of fluorescent screen 74 which undesired impulses would otherwise interfere with the operation of the measuring device.

The synchronizing amplifier 78, which is connected with phototube 77, in addition to the usual amplifying apparatus, comprises an output triode 99 which is supplied by the preceding stages of amplifier 78 with an input wave shown as $q$ in Fig. 5, the input wave being applied to its grid 100 through a coupling capacitor 101.

Referring to Fig. 6, it will be noted that wave $q$ builds up at a point no earlier than that corresponding to the leading edge of screen 74, as represented by undesired pip 80$o$ and that it has died out at a point no later than that corresponding to the trailing edge of screen 74, as represented by the undesired pip 90$p$. It is of full maximum magnitude throughout the full interval between pips 82$p$ and 88$o$ which represent the full external diameter of wire 70. This relationship may be obtained optically, as indicated in Fig. 4 by suitable positioning of horizontal plate 76, with respect to mirror 13 and lamp 109, or by the use of additional mirrors and baffles, not shown, to prevent interaction between the two optical systems. The inclusion within synchronizing amplifier 78 of suitable phase shifting circuits of conventional character will also produce the required synchronizing impulses.

Grid 100 of triode 99 is normally maintained near cathode potential through resistor 102, thus normally producing a substantial space current which causes a corresponding voltage drop across cathode resistor 103. This positive potential is applied to the cathodes 104 and 105 of triodes 106 and 107 respectively. Triode 106 forms a part of trigger circuit 94 and triode 107 similarly forms a part of trigger circuit 95.

Trigger circuits 94 and 95 are thus rendered inoperative so long as their respective triodes 106 and 107 are maintained in a condition of cutoff by the relatively high positive potential applied to cathodes 104 and 105 from cathode resistor 103.

When the synchronizing or gating signal $q$ is applied to grid 100 of triode 99, this tube is caused to cut off for the duration of the signal. The potential across cathode resistor 103 drops accordingly, thereby placing trigger circuits 94 and 95 in an operative condition for the duration of synchronizing wave $q$, since the cathodes 104 and 105 of their triodes 106 and 107 are then effectively at ground potential.

Triodes 106 and 108 are connected as a binary counter stage, or trigger circuit having two conditions of stability. Triodes 107 and 109 are similarly connected. A first negative input pulse will cause the trigger circuit to shift abruptly from either of its conditions of stability to the other, and the next negative pulse will cause it to shift back to its original condition. Many different circuits of this type are known in the art, and the specific circuit shown is by way of illustration.

Grids 110 and 111 of triodes 106 and 108 are maintained at a suitable potential through resistors 112 and 113 which are connected to a source of negative potential designated —. Grid 110 is connected through resistor 114 to anode 115 of the opposite triode 108, and thence through a further resistor 116 to a source of anode potential designated +. Grid 111 of triode 108 is similarly cross-connected with anode 117 of triode 106 through resistors 118 and 119.

Initially, triode 106 is cut off by positive potential applied to its cathode from cathode resistor 103 of the synchronizing amplifier tube 99. This reduces the potential drop in resistor 119 thereby applying a more positive potential to grid 111 of the opposite triode 108 through resistor 118. The conductive condition thus produced in triode 108 causes a comparatively large potential drop in resistor 116 and maintains grid 110 of triode 106 which is presently cut off by the synchronizing triode 99, at a sufficiently negative potential so that it will remain cut off after the trigger circuit is rendered operative.

When the first pip 88o is applied to trigger circuit 94, it passes through an input coupling capacitor 120 to the cathode 121 of a twin diode 122. This pip, which is of negative polarity, passing through anode 123 of diode 122, cannot affect triode 106 which is already cut off, and the pip, or pulse, will be dissipated in the plate circuit of triode 108. In passing through anode 124 of double diode 122, however, it renders grid 111 of triode 108 momentarily more negative, cutting off conduction through this tube. The potential drop through resistor 116 is thereupon reduced, and the resulting positive pulse at anode 115, upon reaching grid 110 causes this latter grid to become more positive thus starting conduction in triode 106 which was previously cut off. This, in turn, abruptly increases the potential drop in resistor 119, rendering grid 111 of the opposite triode more negative and causing it to remain cut off.

By reason of the action of the double diode 122, the positive pulse which accompanied the sudden stoppage of conduction through triode 108 cannot feed back from anode 123 to the circuit of its other anode 124 to interfere with the cut off condition which was originally produced by the incoming negative pip.

The next incoming negative pip will operate in the reverse manner, restoring triode 106 to its original non-conductive condition, and triode 108 to its original conductive condition.

During the interval between the two successive pips 86o and 88o, anode 115 of triode 108 is raised in potential producing a positive half wave of substantially rectangular wave shape. The width of this half wave is proportional to the trailing wall thickness of the insulation 71 of wire 70.

The operation of trigger circuit 95 comprising triodes 107 and 109 is in all respects similar to that of trigger circuit 94 described above. The input to trigger circuit 95, however, consists of the pips 82p and 84p, so that the duration of the rectangular wave appearing at anode 125 of triode 109 will correspond to the leading wall thickness of insulation 71.

Comparator 96 is shown comprising a potentiometer 126 connected to the output of trigger circuit 94 and a similar potentiometer 127 associated with the output of trigger circuit 95. The point of adjustably fixed potential on potentiometer 126 is connected through an indicating instrument 128, such as a voltmeter, to the anode 115 of triode 108. If potentiometer 126 is adjusted to give zero reading on instrument 108 in the absence of pulses, then its indication during operation of the scanning system will be proportional to the average width of the rectangular half wave from anode 115, and hence to the average trailing wall thickness of the insulation 71.

Ordinarily, the greatest accuracy may be obtained by calibrating potentiometers 126 and 128 in terms of nominal wall thickness and using the indicators only for the purpose of determining deviations from the nominal values.

A similar thickness indication with respect to the leading wall is derived by an indicating instrument 129 connected between potentiometer 127 and anode 125 of triode 109.

Concentricity may be read directly from a zero center indicating instrument 130, which is connected between anodes 115 and 125. If the amplitudes of the positive rectangular half waves are adjusted to be equal, then indicating instrument 130 will give a zero reading so long as average durations are equal. Since equal durations for the two half waves corresponds to ideal concentricity, any deviation beyond a certain maximum value will indicate eccentricity requiring correction.

The three indicating instruments 128, 129 and 130 are designated generally as an indicator 97.

It will be apparent, that by the use of somewhat different trigger circuit arrangements, the outside diameter of the wire may be checked, or a continuous indication of the diameter of the inside core may be obtained.

It will also be noted that similar techniques may be applied to dimensional control of such materials as extruded tubing, or other shapes capable of producing an image comprising contrasting portions whose boundaries correspond to the dimension to be measured.

In Fig. 6, the wire 70 is indicated as being in axial rotation. By thus revolving wire 70 or by rotating the necessary portions of the measuring instrument as the wire 70 passes between X-ray tube 73 and fluorescent screen 74, the concentricity of the wire may be measured from a constantly changing direction, thereby providing a concentricity check along more than one cross-sectional diameter of the wire.

Alternatively, the wire may remain angularly fixed, passing successively through a plurality of separate measuring devices operating at different angles with respect to each other. Such an arrangement will comprise a plurality of separate fluorescent screens 74 arranged at different dihedral angles with respect to each other, their planes all being parallel to the longitudinal axis of wire 70. Any suitable X-ray lighting arrangement which will cause separate and distinct shadows of wire 70 to fall simultaneously on all of the several fluorescent screens, will provide the desired results.

In the arrangement where the wire passes through successive measuring devices, all of the apparatus shown in Fig. 4, including suitable provision for X-ray illumination, will be separately provided for each of the fluorescent screens.

What is claimed is:

1. In a device for the measurement of a dimension of an object; focusing means for producing an image of the object comprising boundary lines which correspond to the dimension to be measured; scanning means including radiation responsive means for deriving an electrical signal from the image, the image signal having a wave shape in which the portions of maximum slope are produced by the leading and trailing boundary lines of the image in the direction of measurement; pulse producing means responsive to the portions of maximum slope of the wave shape of the image signal, the pulse producing means producing a first pulse at the leading edge of the image, and a second pulse at the trailing edge thereof; and indicating means responsive to the interval between the two pulses for producing an indication of the magnitude of the dimension to be measured.

2. A device as in claim 1 in which the focusing means comprises a source of penetrative radiations and a fluorescent screen illuminated by the source, the object to be measured being interposed between the source and the screen to produce a shadow thereon.

3. In a device for the measurement of a dimension of an object; focusing means for producing an image of the object comprising boundary lines which correspond to the dimension to be measured; cyclical scanning means including radiation responsive means for deriving an electrical signal from the image wherein the image signal has a wave shape in which the portions of maximum slope are produced by the leading and trailing boundary lines of the image in the direction of measurement; differentiating means responsive to the image signal for deriving an intermediate signal which includes peaks corresponding to said portions of maximum slope of the image signal; pulse producing means responsive to said peaks of said intermediate signal for producing a first pulse at the intermediate signal peak corresponding to the leading edge of the image and a second pulse at the intermediate signal peak corresponding to the trailing edge thereof; and indicating means responsive to the interval between the two pulses for producing an indication of the magnitude of the dimension to be measured.

4. A device as in claim 3 in which the magnitude of the indication of the indicating means is substantially proportional to the ratio of the interval between said two pulses to the full interval of the scanning cycle.

5. A device as in claim 3 in which the focusing means comprises a source of penetrative radiations and a fluorescent screen illuminated by the source, the object to be measured being interposed between the source and the screen to produce a shadow thereon.

6. A device as in claim 3 in which the polarity of the first pulse is opposite to that of the second pulse, and in which the indicating means comprises a trigger circuit having two conditions of stability, the trigger circuit being shifted from one stable condition to the other in response to the first pulse and back to the first-named stable condition in response to the second pulse, and an electrical indicating instrument connected to the trigger circuit for giving an indication determined by the average interval for which the trigger circuit remains in a predetermined one of its two stable conditions, said indication varying in accordance with variations in the dimension to be measured.

7. A device as in claim 3 comprising further differentiating means connected in cascade relationship with respect to the first-named differentiating means, said further differentiating means producing a further signal the wave shape of which alternates in polarity and is substantially the second derivative of said image signal, said further signal wave shape crossing its axis of zero magnitude at points determined by the points of zero slope of said intermediate signal.

8. In a device for the measurement of a dimension of an object; focusing means for producing an image of the object comprising boundary lines which correspond to the dimension to be measured; scanning means including radiation responsive means for deriving an electrical signal from the image wherein the image signal has a wave shape in which the portions of maximum slope are produced by the leading and trailing boundary lines of the image in the direction of measurement; a first differentiating means responsive to the image signal for deriving a first intermediate signal which includes peaks corresponding to said portions of maximum slope of the image signal; a second differentiating means connected in cascade relationship with respect to the first differentiating means producing a second intermediate signal which has a zero value at said peaks of said first intermediate signal, pulse producing means responsive to the points of zero value of said second intermediate signal for producing a first pulse at the signal peak of the first intermediate signal corresponding to the leading boundary line of the image and a second pulse at the signal peak of the first intermediate signal corresponding to the trailing boundary line thereof; and indicating means responsive to the ratio of the interval between the two pulses to the full interval of the scanning cycle for producing an indication of the magnitude of the dimension to be measured.

9. In a device for the measurement of a dimension of an object; focusing means for producing an image of the object comprising boundary lines which correspond to the dimension to be measured; scanning means including radiation responsive means for deriving an electrical signal from the image wherein the image signal has a wave shape in which the portions of maximum slope are produced by the leading and trailing boundary lines of the image in the direction of measurement; a first differentiating means responsive to the image signal for deriving an intermediate signal which includes peaks corresponding to said portions of maximum slope of the image signal; a second differentiating means connected in cascade relationship with respect to the first differentiating means for producing zero amplitude points corresponding to the peaks of the intermediate signal to provide a modified intermediate signal; pulse producing means responsive to said zero amplitude points of said modified intermediate signal for producing a first pulse at the instant corresponding to the leading boundary line of the image and a second pulse at the instant corresponding to the trailing boundary line thereof; a trigger circuit responsive to the pulse producing means and having two conditions of stability, the trigger circuit being shifted from one condition of stability to the other in response to the first pulse and back to the first-named condition of stability in response to the second pulse; and an electrical indicating instrument connected to the trigger circuit for giving an indication determined by the average duration of the interval during which the trigger circuit remains in a predetermined one of its two stable conditions, said indication varying in accordance with variations in the dimensions to be measured.

10. A device as in claim 9 in which the focusing means comprises a source of penetrative radiations and a fluorescent screen illuminated by the source, the object to be measured being interposed between the source and the screen to produce a shadow thereon.

11. In a device for the measurement of a plurality of linear dimensions of an object; said object comprising external portions and a central portion, said external portions being of opacity to penetrative radiations which differs appreciably from the opacity of said central portions to said radiations; a source of radiations capable of penetrating the object to be measured and disposed to illuminate said object; a screen so disposed as to be illuminated by radiations from said source, said object being interposed between said source and said screen to cast a shadow on said screen, said shadow having areas of differing densities separated by boundary lines determined by said differences in opacity between said external and central portions of said object, said screen including means for producing luminescence which varies in accordance with the intensity of radiations received from said source; focusing means for producing an image of said screen and the shadow thereupon; scanning means including luminescence responsive means for deriving an electrical signal from the image wherein the image signal has a wave shape in which the portions of maximum slope are produced by the leading and trailing edges of the image of said screen, and by the leading and trailing edges of said shadow and boundary lines within the shadow; a first differentiating means responsive to the image signal for deriving an intermediate signal which includes peaks corresponding to said portions of maximum slope of the image signal; a second differentiating means connected in cascade relationship with respect to the first differentiating means for producing zero amplitude points corresponding to the peaks of the intermediate signal to provide a modified intermediate signal; pulse producing means responsive to said zero amplitude points of said modified intermediate signal for producing a series of six pulses at the leading and trailing edges of said screen, shadow, and boundary lines; means for separating the two pulses corresponding to the leading edge of said shadow and the leading boundary line within the shadow from the two pulses corresponding to the trailing boundary line and the trailing edge of said shadow for producing first and second sets of pulses; two independent trigger circuits, each responsive to one of the two sets of pulses and each having two conditions of stability, each trigger circuit being shifted from one condition of stability to the other in response to the first pulse and back to the first-named condition of stability in response to the second pulse; and an electrical indicating instrument connected to the trigger circuit for giving an indication determined by the average duration of time that the trigger circuit remains in a predetermined one of its two stable conditions, said indication varying in accordance with variations in the dimensions of one of the external portions of said object; and synchronizing means for rendering the two trigger circuits unresponsive to the pulses corresponding to the edges of said screen image.

12. A device as in claim 11 and further comprising indicating means interconnected between the two trigger circuits whereby the concentricity of the central portion of the object with respect to its external portions may be determined.

CARL A. VOSSBERG, JR.

References Cited in the file of this patent

UNITED STATES PATENTS

| Number | Name | Date |
|---|---|---|
| 2,408,078 | Labin et al. | Sept. 24, 1946 |
| 2,448,718 | Koulicovitch | Sept. 7, 1948 |
| 2,451,572 | Moore | Oct. 19, 1948 |
| 2,467,812 | Clapp | Apr. 19, 1949 |
| 2,469,206 | Rich | May 3, 1949 |
| 2,525,292 | Fua et al. | Oct. 10, 1950 |
| 2,547,212 | Jamison et al. | Apr. 3, 1951 |
| 2,549,402 | Vossberg, Jr. | Apr. 17, 1951 |
| 2,557,868 | Fua et al. | June 19, 1951 |